United States Patent [19]
Matsumoto et al.

[11] Patent Number: 5,186,064
[45] Date of Patent: Feb. 16, 1993

[54] WIPER FOR USE IN A VEHICLE

[75] Inventors: Hiroshi Matsumoto, Hamamatsu; Toshiharu Aoyama, Kosai; Mitsuhiko Saitoh, Aichi; Toshiaki Oshima, Kosai, all of Japan

[73] Assignee: Asmo Co., Ltd., Japan

[21] Appl. No.: 738,144

[22] Filed: Jul. 30, 1991

[30] Foreign Application Priority Data

Jul. 31, 1990 [JP] Japan .................. 2-203525

[51] Int. Cl.⁵ ............................. F16H 21/18
[52] U.S. Cl. ............................. 74/47; 74/105; 15/250.30
[58] Field of Search ............... 74/43, 47, 105; 15/250.13, 250.16, 250.23, 250.30, 250.34

[56] References Cited

U.S. PATENT DOCUMENTS

| | | | |
|---|---|---|---|
| 2,533,963 | 12/1950 | Sacchini | 15/250.34 X |
| 2,895,158 | 7/1959 | Riester | 15/250.3 |
| 2,949,035 | 8/1960 | Harrison | 74/47 X |
| 3,831,220 | 8/1974 | Gmeiner et al. | 15/250.23 X |
| 4,791,698 | 12/1988 | Murata | 15/250.16 X |
| 4,817,236 | 4/1989 | Epple et al. | 15/250.34 |

FOREIGN PATENT DOCUMENTS

| | | | |
|---|---|---|---|
| 2942757 | 5/1981 | Fed. Rep. of Germany | 15/250.30 |
| 3626643 | 2/1988 | Fed. Rep. of Germany | 15/250.13 |
| 63-189857 | 12/1988 | Japan | |
| 63-189858 | 12/1988 | Japan | |

Primary Examiner—Leslie A. Braun
Assistant Examiner—David W. Laub
Attorney, Agent, or Firm—Venable, Baetjer, Howard & Civiletti

[57] ABSTRACT

A wiper is provided for use in a vehicle for wiping the windshield glass. A holder is fixed to a baseplate of the vehicle body and, against the holder, an inner bearing is supported so as to rotate about its axis. A pivot shaft is inclined relative to the axis of the inner bearing while being rotatably supported. The driving force is transmitted from a driving source into driving forces for a first driving apparatus for driving the pivot shaft and second driving apparatus for driving the inner bearing. Inversion apparatus or a rotating apparatus always rotates the second driving apparatus either in a direction opposite to or in the same direction as the rotational direction of the first driving apparatus.

19 Claims, 10 Drawing Sheets

WIPER FOR USE IN A VEHICLE

BACKGROUND OF THE INVENTION a) Field of the Invention

The present invention relates to a wiper for use in a vehicle for wiping a windshield glass or the like.

b) Description of the Related Art

In a wiper for use in a vehicle for wiping the wind shield glass or the like, it is necessary to set the angle of a wiper blade with respect to the windshield glass (i.e. attack angle) to be within a predetermined range over the entire wiping range (the wiping angle) so that, even if the windshield glass has a large curvature, the wiper can reliably wipe the glass without deterioration of its performance.

Accordingly, in order to meet the demand posed by windshield glasses of larger curvature, a wiper has been devised (for example, Japanese Utility Model Application Laid-Open No. 63-189858), in which a wiper arm is fixed and a pivot shaft for reciprocatively rotating the wiper arm is first disposed on the vehicle body so as to be inclined relative thereto, alternatively wiper (for example, Japanese Utility Model Application Laid-Open No. 63-189857), in which the direction of inclination of the pivot shaft relative to the vehicle body is changed by rotating the bearing and inner bearing of the pivot shaft independently of the shaft.

In this kind of wiper, (for example, in the wiper shown in Japanese Utility Model Application Laid-Open No. 63-189857), a bearing (termed an eccentric shaft in the above-described Utility Model) is disposed so as to rotate relative to the vehicle body about own axis, and so as to rotatably support the pivot shaft in an inclined position relative to the axis of the bearing. In addition, the pivot shaft and the bearing are each coupled to a wiper motor as a driving source via a linkage or the like.

When the wiper is actuated, the rotating force of the wiper motor is transmitted to the pivot shaft via the link or the like to cause the pivot shaft to reciprocatively rotate the wiper arm and blade, while at the same time the rotating force of the motor is also transmitted to the bearing so as to cause it to rotate independently of the pivot shaft.

As a result, the inclination of the pivot shaft relative to the vehicle body is changed according to the rotation of the wiper arm and blade and, even with a windshield glass of large curvature, the attack angle becomes easy to set within a predetermined range.

However, in such a conventional wiper, although the direction of inclination the pivot shaft relative to the vehicle body can be changed, it has not been sufficiently easy to adjust it when the attack angle is set within a predetermined range.

That is, the above-described bearing is reciprocated twice for a single reciprocating motion of the pivot shaft (wiper arm and blade). In other words, since the bearing is rotated at the beginning in the same direction as the rotating direction of the pivot shaft and is then inverted so as to be rotated in the opposite direction, in the substantially intermediate portion of the wiping range comprising the wiping angle of the wiper arm and blade, the resulting relative rotational directions of the pivot shaft and the bearing are opposite to one another, and, further, after the inversion, the relative rotational speed of both the pivot shaft and the bearing is doubled. In consequence, a change in the direction of inclination of the pivot shaft relative to the vehicle body, which is determined by the position at which the pivot shaft and the bearing are relatively rotated, becomes complicated, which makes it difficult to adjust the attack angle to within the predetermined range.

In addition, according to a conventional wiper, since a reduction gear mechanism is provided at the wiper motor portion and each reduction gear is individually coupled to the pivot shaft portion by means of a linkage so as to individually transmit the rotational force of each of the reduction gear, the entire system becomes bulky, which makes it difficult to dispose these parts and mechanism in a small space.

SUMMARY OF THE INVENTION

In view of the above-described facts, an object of the present invention is to produce a wiper for use in a vehicle which is capable not only of having the attack angle set to be within a predetermined range, but which can also achieve continuous, linear of the changes in the direction of inclination of the pivot shaft relative to the vehicle body so that the attack angle may be readily adjusted to be within the predetermined range and this can be realized by a small-sized, simple arrangement.

The present invention is used for a wiper which wipes the windshield glass of an automobile. A holder is fixed to the baseplate of a vehicle body and an eccentric bearing member is rotatably supported against the vehicle body about its axis. Against the eccentric bearing member, a pivot shaft is rotatably supported, the pivot shaft being inclined relative to the axis of the bearing. At one end of the pivot shaft, a wiper arm is fixed and the reciprocative (i.e., back and forth) rotation of the pivot shaft about its own axis causes the wiper arm to be reciprocatively pivot on the pivot shaft. The driving force from a driving source is transmitted via a rotating means to reciprocatively rotate the pivot shaft in a direction opposite to or in the same direction as that of the reciprocative rotation of the pivot shaft, while remaining constantly in interlocking engagement with the eccentric bearing member.

According to the above-described arrangement of the present invention, when the wiper is actuated, the driving force of the driving source is transmitted to the pivot shaft via the rotating means to cause the pivot shaft to reciprocatively rotate so as to reciprocatively pivot the wiper arm and the blade. Further, at the same time, the driving force of the driving source is also transmitted to the eccentric bearing member and this eccentric bearing member is rotated independently of the pivot shaft. As a result, the inclination of the pivot shaft relative to the vehicle body is changed according to the rotation of the wiper arm and the blade so that the attack angle may be set to be within a predetermined range. Also, in this case, since the eccentric bearing member is constantly rotated by the rotating means in a direction opposite to or in the same direction as the direction of the reciprocative rotation of the pivot shaft, this eccentric bearing member is necessarily reciprocated in only one direction for a single reciprocating movement of the pivot shaft, that is, it is rotated with the same cycle. In consequence, it cannot happen that, at an intermediate point in the wiping range of the wiper arm and the blade, the relative rotational directions of the pivot shaft and the eccentric bearing member are reversed with respect to one another or that their relative rotational speed is changed. As a result, the change in the direction of inclination of the pivot shaft relative to the vehicle body, which is determined by the relative rotational positions of the pivot shaft and the eccentric bearing member, assumes a continuous and linear form. Therefore, the angle of inclination of the pivot shaft can be changed not only so that the attack angle may be set to be within the predetermined range; but also so that the difficulty of the adjustment required to set the attack angle to the predetermined range is eased.

BRIEF DESCRIPTION OF THE DRAWINGS

The present invention is now hereinafter described with reference to the accompanying drawings in which.

DETAILED DESCRIPTION OF THE PREFERRED EMBODIMENTS

Figure 4:
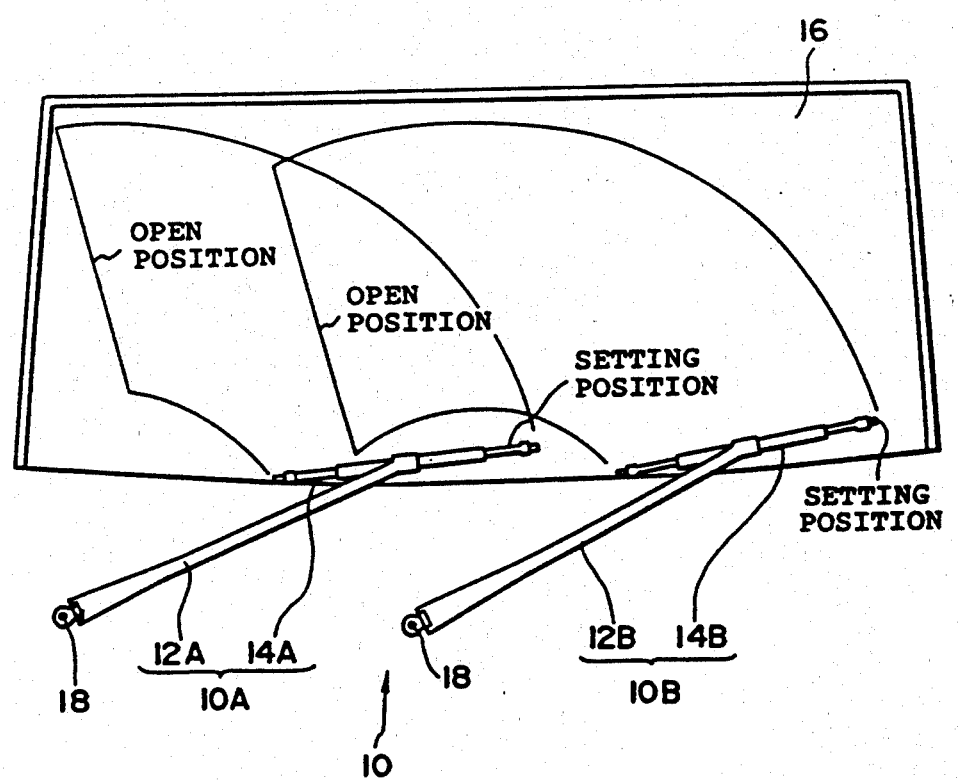
FIG. 4 is an overall view of the arrangement of a wiper for use in a vehicle.

FIG. 4 illustrates an entire schematic view of the arrangement of a wiper 10 for use in a vehicle according to a first embodiment of the present invention.

The wiper 10 is of a parallel interlocking type essentially comprising a right wiper 10A and a left wiper 10B each having the same construction. The right and left wipers comprise wiper arms 12A and 12B and wiper blades 14A and 14B respectively. The reciprocative rotation of the wiper arms 12A and 12B causes the wiper blades 14A and 14B to each reciprocatively rotate between respective set position and open positions to wipe off raindrops adhering to a windshield glass 16.

In this case, since the right wiper 10A and the left wiper 10B are basically of identical construction, only the right wiper 10A is described hereinafter.

The wiper arm 12A of the right wiper 10A is rotatably supported by being fixed to one end of the pivot shaft 18. Thus the wiper arm 12A and the wiper blade 14A are constantly rotated together with the pivot shaft 18.

Figure 1:
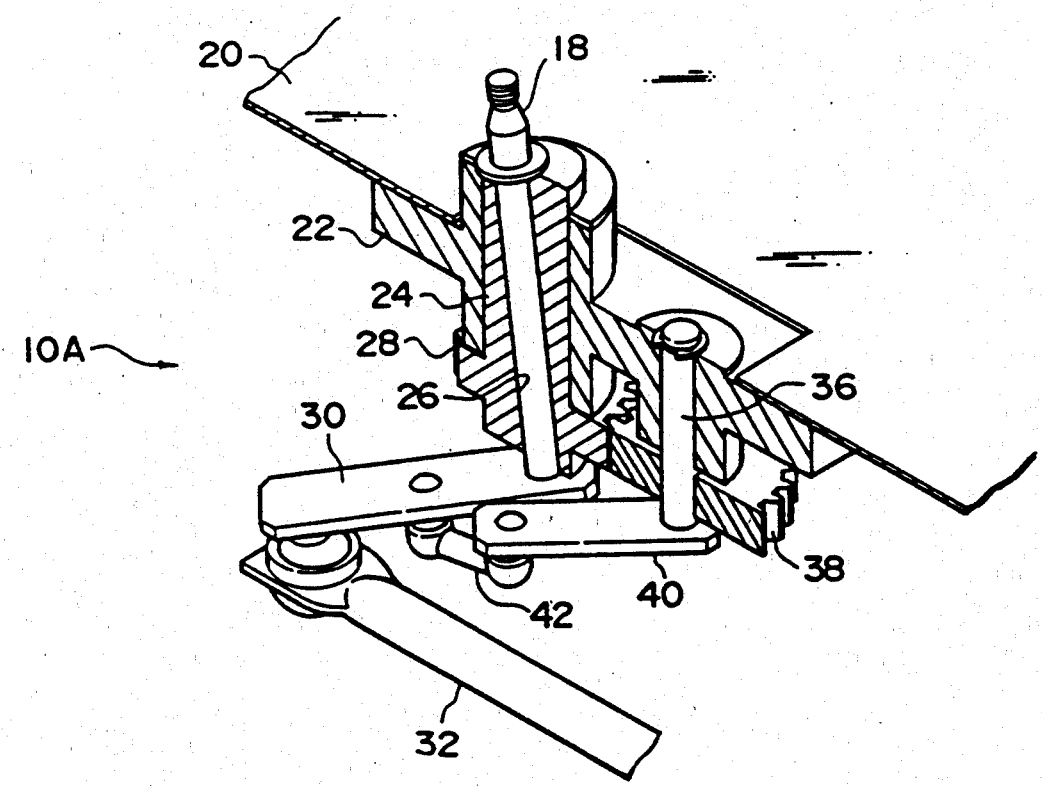
FIG. 1 is a partially cutaway perspective view illustrating the neighborhood of a pivot shaft of a wiper for use in a vehicle according to a first embodiment of the present invention.
Figure 2:
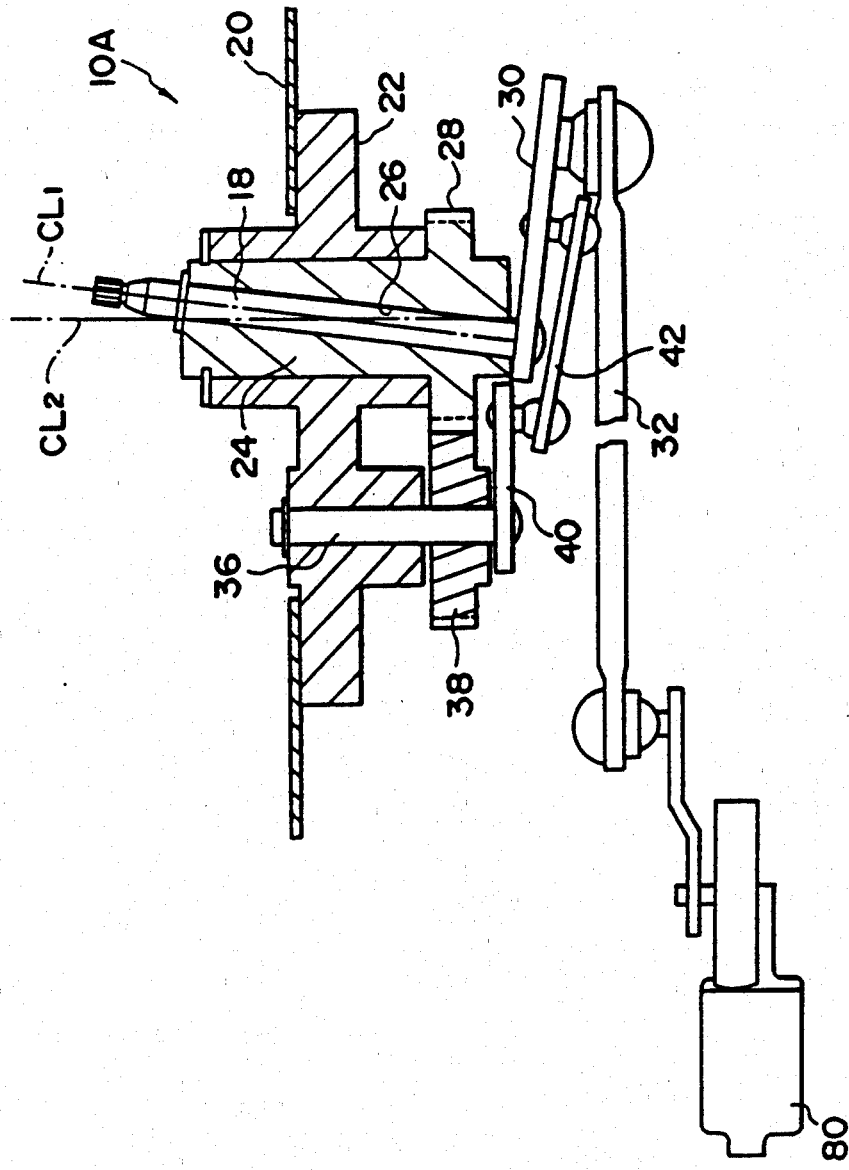
FIG. 2 is a cross-sectional view of the neighborhood of the pivot shaft according to the first embodiment.
Figure 3:
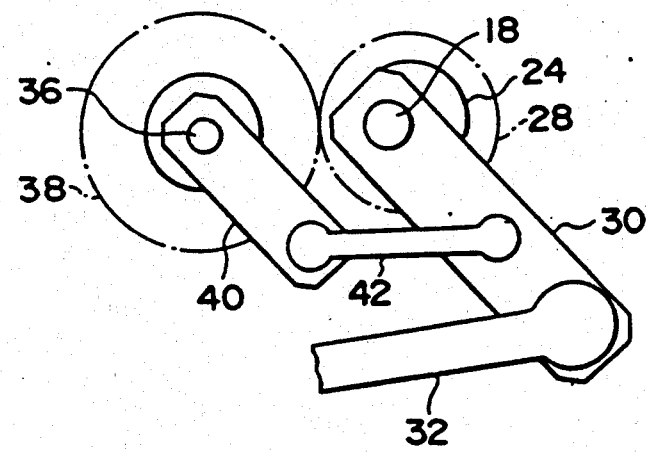
FIG. 3 is a rear view of the neighborhood of the pivot shaft according to the first embodiment.

In FIG. 1, the neighborhood of the pivot shaft 18 is illustrated by a partially cutaway perspective view. In addition, in FIG. 2, a cross-sectional view of the neighborhood of the pivot shaft 18 is illustrated. In FIG. 3, a rear view of the neighborhood of the pivot shaft 18 is illustrated.

In the neighborhood of the pivot shaft 18, a holder 22 is fixed to a baseplate of the vehicle body and, further, on this holder 22, an inner bearing 24, which acts as an eccentric bearing member, is supported. The inner bearing 24 is supported against the holder so as to rotate about its axis CL2, and a supporting hole 26 is formed so as to be inclined relative to this axis CL2. Into this supporting hole 26, the pivot shaft 18 is inserted so as to be rotatably supported. Accordingly, the pivot shaft 18 is supported so that its axis CL1 is inclined relative to the axis CL2 of the inner bearing 24 and hence also relative to the baseplate 20 of the vehicle body.

A gear portion 28 is integrally formed about the outer circumference of the inner bearing 24 in the neighborhood of the lower end portion thereof. As a result, the inner bearing 24 is integrally rotated with the gear portion 28. Meanwhile, after the lower end of the pivot shaft 18 is made to protrude from the lower end portion of the inner bearing 24, one end of a pivot lever 30, which constitutes a rotating means, is fixed thereto. As a result, by rocking the pivot lever 30, the pivot shaft 18 can be rotated. One end of a linkage rod 32 is coupled to the other end of the pivot lever 30 and the other end of the linkage rod 32 is coupled to a wiper motor 80. As a result, the rotating force of the wiper motor 80 is transmitted to the pivot lever 30 via the linkage rod 32.

Meanwhile, in the neighborhood of the pivot shaft 18 and the inner bearing 24, a shaft 36 is rotatably supported by means of the holder 22. The shaft 36 is disposed so that its axis is parallel to that of the inner bearing 24. Further, in the neighborhood of the lower end portion thereof, a gear 38 is fixed. This gear 38 mates with the gear portion 28 of the inner bearing 24. In consequence, when the gear 38 is rotated, the rotating force is transmitted by the gear portion 28 so that the inner bearing 24 is rotated in a direction opposite to the gear 38.

At the lower end portion of the shaft 36, one end of the lever 40, which constitutes a rotating means, is fixed. As a result, by rocking the lever 40, the shaft 36 and the gear 38 can be rotated. To the other end of the lever 40, one end of a coupling rod 42 is coupled, and the other end of the coupling rod 42 is coupled to an intermediate portion of the pivot lever 30. Therefore, when the pivot lever 30 is rocked, this rocking force is transmitted to the lever 40 via the coupling rod 42, and the lever 40 is rocked in the same direction as the pivot lever 30.

Next, the operation of this embodiment is described.

In the case of the right wiper 10A of wiper 10 according to the above-described arrangement, when the wiper is actuated, the driving force of the wiper motor 80 is transmitted to the pivot lever 30 via the linkage rod 32 to reciprocatively rotate the pivot lever 30. correspondingly, the pivot shaft 18 is reciprocatively rotated with respect to the bearing, and the wiper arm 12A and the wiper blade 14A are therefore reciprocatively pivoted on the pivot shaft. Along with this, the driving force of the wiper motor 80, which has been transmitted to the pivot lever 30, is also transmitted to the lever 40 via the coupling rod 42. As a result, as the pivot lever 30 is rocked, the lever 40 is also rocked in the same direction to rotate the gear 38. Here, since the gear 38 mates with the gear portion 28 of the inner bearing 24, when the gear 38 is rotated, the rotating force is transmitted by the gear portion 28 and the inner bearing 24 is rotated in a direction opposite to the gear 38. That is, the inner bearing 24 is always independently rotated in a direction opposite to the pivot shaft 18.

As a result, the angle of inclination of the pivot shaft 18 relative to the baseplate 20 is changed according to the angle of rotation of the wiper arm 12A and, even if the curvature of the window glass 16 is large, the attack angle of the wiper blade 14A can be set to be within a predetermined range.

Figure 5:
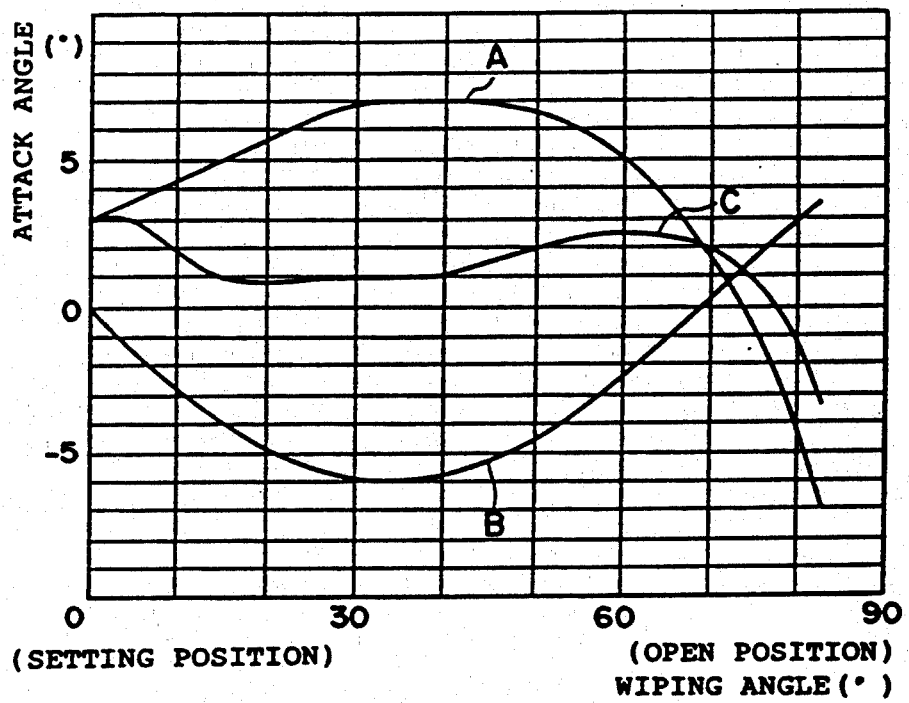
FIG. 5 is a diagrammatic view illustrating changes of the attack angle corresponding to the wiping angle of the wiper.

In FIG. 5, change in the attack angle corresponding to change in the wiping angle of the wiper 10 according to this embodiment is illustrated.

In the same figure, a curve A illustrates an attack angle curve in a state in which the inner bearing 24 is fixed (hence, corresponding to the curved surface of the window glass), a curve B an attack angle curve relative to an imaginary plane glass in the case in which the inner bearing 24 rotates, (as in this embodiment), and a curve C an attack angle curve for the actual window glass 16 in the case in which the inner bearing 24 rotates, (as in this embodiment) (in other words, after the attack angle is corrected).

As is obvious from this figure, when the inner bearing 24 is rotated according to the curved surface of the window glass, even if the curvature of the window glass is large, the attack angle of the wiper blade 14A can be set to be within a predetermined range (for example, ±5 degrees).

In addition, in this case, since the rotation of the inner bearing 24 caused by the rocking of the lever 40 and the rotation of the gear 38 is always in the opposite direction from to the reciprocative rotational direction of the pivot shaft 18, this inner bearing 24 is necessarily reciprocated only in one direction for a single, one directional reciprocative movement of the pivot shaft 18 and attached wiper arm 12A and wiper blade 14A. That is, they are rotated in the same cycle.

Figure 6A:
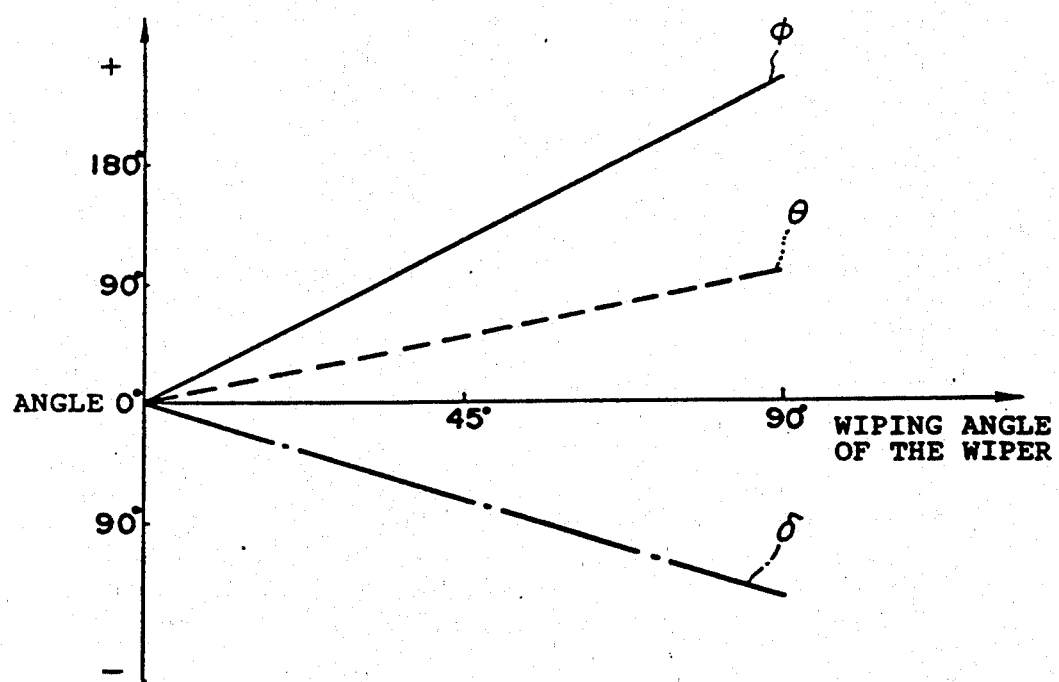
FIG. 6A is a diagrammatic view illustrating change in the relative amount rotation of the pivot shaft and the inner bearing with respect to each other corresponding to change in the wiping angle of a wiper according to the first embodiment of the present invention.
Figure 6B:
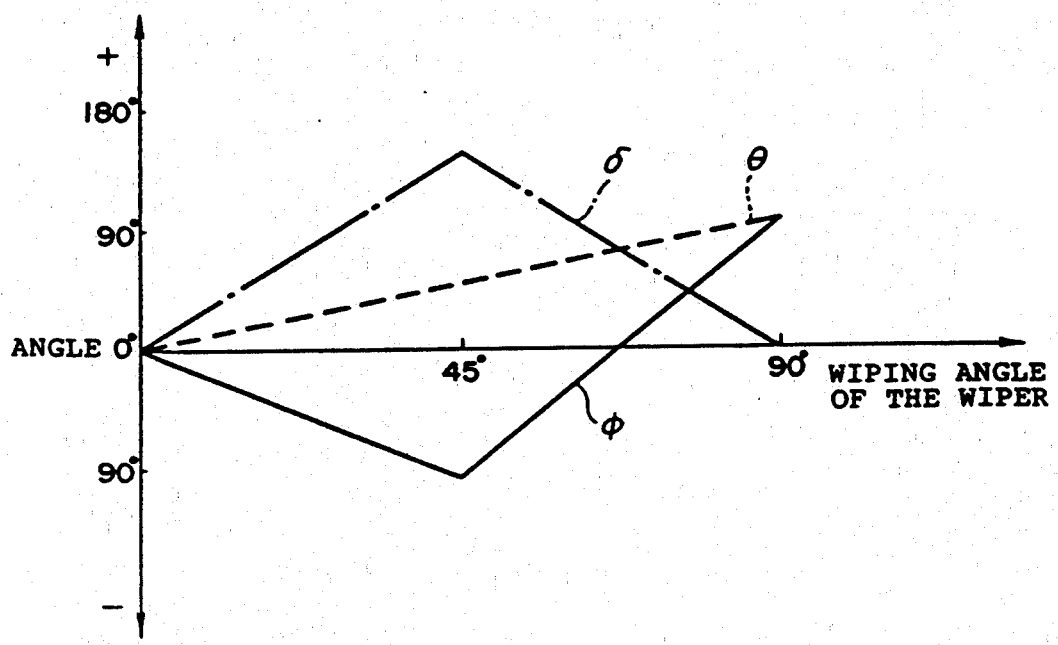
FIG. 6B is a diagrammatic view illustrating a change in the relative rotation of the pivot shaft and the bearing of a conventional wiper.

In FIG. 6A, change in the relative amount of rotation of the pivot shaft 18 and the inner bearing 24 with respect to each other corresponding to change in the wiper angle of a wiper are illustrated while, in FIG. 6B, change in the relative amount of rotation of a conventional pivot shaft (of a wiper disclosed in the above-described Japanese Utility Model Application Laid-Open No. 63-189857) and an inner bearing (as a bearing) is illustrated.

In the same figure, a line θ denotes the rotating angle of the pivot shaft 18 and the wiper arm 12A (i.e., the wiping angle of the wiper blade 14A), a line δ the rotational angle of the inner bearing 24 (as a bearing) and a line φ the relative amount of rotation of the pivot shaft 18 and the inner bearing 24. With respect to one another in addition the "+" shown along the vertical axis of the figure denotes the same direction relative to the rotational direction of the pivot shaft 18 and "−" the opposite direction relative thereto.

As is obvious from FIG. 6B, in the conventional wiper, at first, the bearing is rotated in the same direction as the pivot shaft and then reversed so as to be rotated in the opposite direction. In other words, it is reciprocated twice for a single one-directional reciprocative motion of the pivot shaft (wiper arm and blade). As a result, in a substantially intermediate portion of the wiping range of the wiper arm and blade, the rotational directions of the pivot shaft and the bearing respectively are made to be opposite to each other and, so, the relative rotational speed doubles. As a result, the change in the direction of inclination of the pivot shaft relative to the vehicle body (as indicated by line φ), which is determined by the relative rotational positions of the pivot shaft and the bearing, becomes complicated, which makes it difficult to adjust the attack angle to be within the predetermined range.

In contrast, according to the right wiper 10A of wiper 10 of the first embodiment, as is obvious from FIG. 6A, the inner bearing 24 is always rotated in a direction opposite to the reciprocative rotation of the pivot shaft 18 and in the same cycle. In consequence, it cannot happen that, in the intermediate portion of the wiping range (angle) of the wiper blade 14A, the relative rotational directions of the pivot shaft 18 and the inner bearing 24 are caused to be opposite with respect to each other, or their relative rotational speed is changed. As a result, the changes in the direction of inclination of the pivot shaft 18 relative to the vehicle body (as indicated by line φ), which are determined by the relative rotational position of the pivot shaft 18 and the inner bearing 24, assume a continuous and linear form.

Therefore, since the angle of inclination of the pivot shaft 18 is changed, the attack angle is capable only of being set to the predetermined range, but also this adjustment of the attack angle can be readily accomplished.

In addition, in the right wiper 10A of wiper 10 of the above-described arrangement, since the pivot shaft 18 and the inner bearing 24 can be rotated together by a single linkage rod 32, the entire apparatus can be made small, which allows it to be used within a small space.

Figure 7:
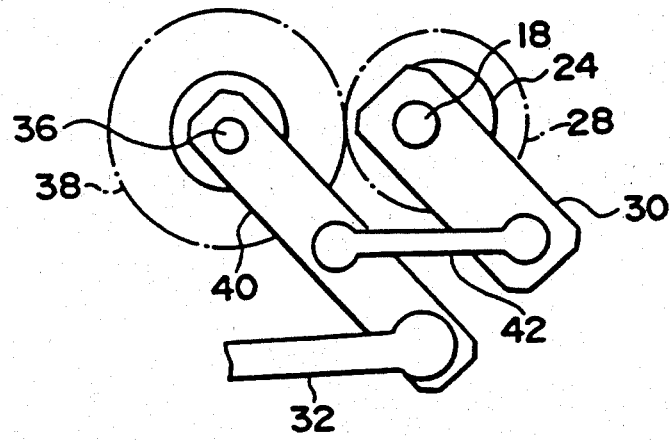
FIG. 7 is a rear view illustrating of the neighborhood of the pivot shaft in a modified example of the first embodiment.

Incidentally, although, in the first embodiment, the linkage rod 32 coupled to the wiper motor 80 is directly coupled to the pivot lever 30, alternatively, as is described in FIG. 7, the end portion of the lever 40 may be extended and the linkage rod 32 may be coupled to this extension.

Even in this case, the rocking force of the linkage rod 32 can be transmitted to the lever 40 and the pivot lever 30 so that the inner bearing 24 can always be rotated in a direction opposite to the reciprocative rotational direction of the pivot shaft 18.

Next, another embodiment of the present invention is described. Incidentally, the same signs as in the first embodiment are assigned to basically the same parts as in the first embodiment and their description is omitted.

Figure 8:
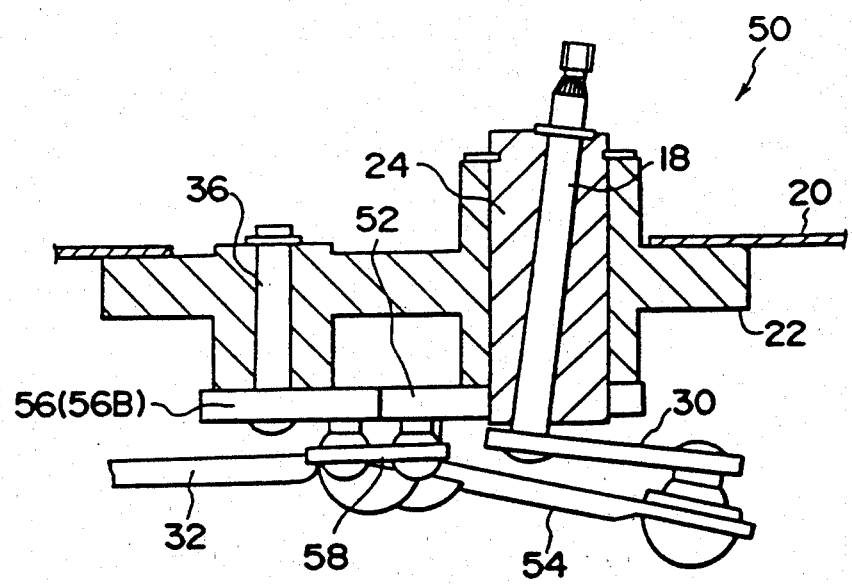
FIG. 8 is a cross-sectional view of the neighborhood of the pivot shaft of a vehicle wiper according to a second embodiment of the present invention.
Figure 9:
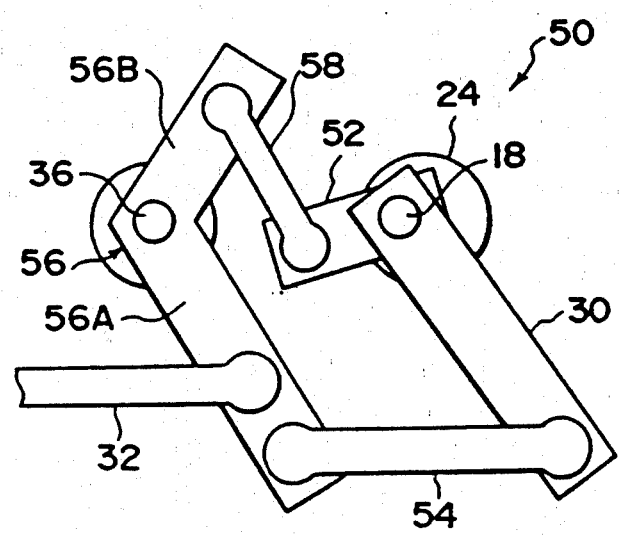
FIG. 9 is a rear view of the neighborhood of the pivot shaft according to the second embodiment.

In FIG. 8, a cross-sectional view of the neighborhood of the pivot shaft 18 of the wiper 50 according to a second embodiment is shown while, in FIG. 9, a rear view of the neighborhood of the pivot shaft 18 is shown.

At the lower end portion of the inner bearing 24, which rotatably supports the pivot shaft 18 in an inclined position, in place of the gear portion 28 as in the first embodiment, the lever 52 is fixed. As a result, by rocking the lever 52, the inner bearing 24 can be rotated. Meanwhile, to the other end of the pivot lever 30 fixed to the lower end of the pivot shaft 18, one end of the rod 54 is coupled, and the other end of the rod 54 is coupled to a crank lever 56 fixed to the pivot shaft 36.

The crank lever 56 is a cranked lever, in which an arm portion 56A and an arm portion 56B are jointed to form an intermediate portion, as viewed in the longitudinal direction, having a substantially right angle, and the rod 54 is coupled to the tip end of the arm portion 56A. In addition, at a substantially intermediate portion of the arm portion 56A, the linkage rod 32 coupled to the wiper motor 80 is coupled. As a result, the rotating force of the wiper motor 80 is transmitted to the arm portion 56A of the crank lever 56 via the linkage rod 32 while being also transmitted to the pivot lever 30 via the rod 54, so that the arm portion 56A and the pivot lever 30 are always rocked in the same direction.

Meanwhile, to the tip end portion of the arm portion 56B of the crank lever 56, one end of the rod 58 is coupled, and the other end of the rod 58 is coupled to the tip end of the above-described lever 52. As a result, when the arm portion 56B of the crank lever 56 is rocked, this rocking force is transmitted as a backward rocking force to the lever 52 via the rod 58 so that the lever 52 is always rocked in a direction opposite to the crank lever 56, and the pivot lever 30.

Next, the operation of the second embodiment is described.

In the wiper of the above-described arrangement, when the wiper is actuated, the driving force of the wiper motor 80 is transmitted to the crank lever 56 via the linkage rod 32 while being simultaneously transmitted to the pivot lever 30 via the rod 54 so that the pivot lever 30 is reciprocatively rotated. As a result, the pivot shaft is reciprocatively rotated and the wiper arm 12A and the wiper blade 14A are reciprocatively rotated. Again, along with this, the driving force of the wiper motor 80 transmitted to the crank lever 56 is also transmitted to the lever 52 via the arm portion 56B and the rod 58. Therefore, as the pivot lever 30 is rocked, the lever 52 is rocked in the opposite direction and the inner bearing 24 is rotated in a direction opposite to the gear 38. That is, also in this embodiment, the inner bearing 24 is always independently rotated in a direction opposite to the pivot shaft 18.

Therefore, the inclination of the pivot shaft 18 relative to the baseplate 20 is changed according to the rotation of the wiper arm 12A and, even if the curvature of the window glass 16 is large, the attack angle of the wiper blade 14A can be set to be within the predetermined range.

In addition, also in the second embodiment, since the inner bearing 24 is always rotated in a direction opposite to the reciprocally rotating direction of the pivot shaft 18 and in the same cycle, it cannot happen that, in the intermediate portion of the angle constituting the wiping range of the wiper blade 14A, the relative rotational directions of the pivot shaft 18 and the inner bearing 24 are made to be opposite from each other, or that their relative rotational speed is changed. As a result, the change in the direction of inclination of the pivot shaft 18 relative to the vehicle body, which is determined by the respective positions to which the pivot shaft 18 and the inner bearing 24 are relatively rotated, assumes a continuous and linear form.

As a result, the angle of inclination of the pivot shaft 18 is changed so that the attack angle is capable not only of being set to be within a predetermined range, but also this adjustment of attack angle can be readily accomplished.

Figure 10:
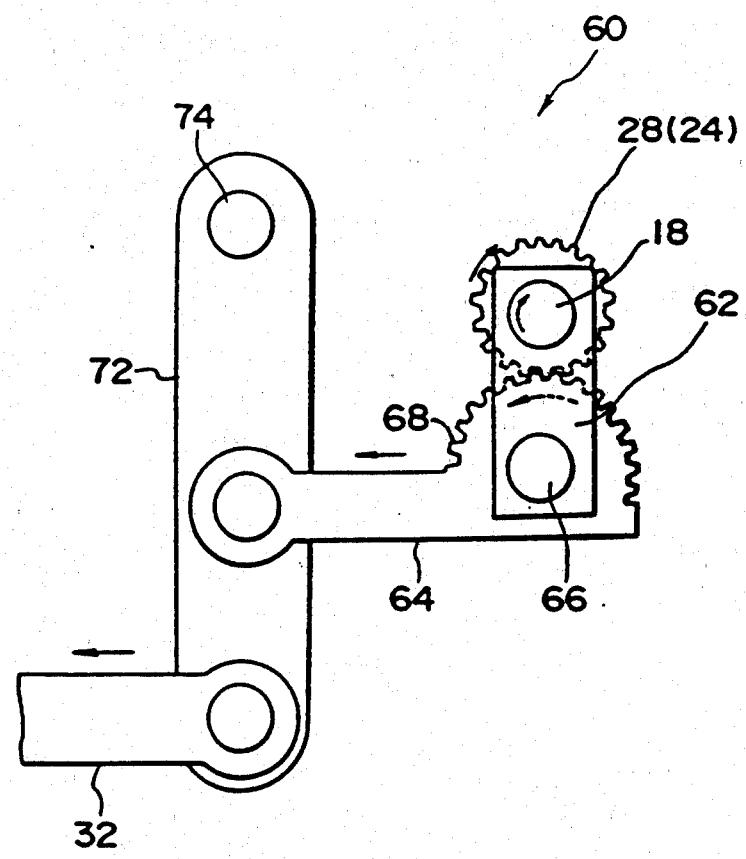
FIG. 10 is a rear view of the neighborhood of the pivot shaft of the vehicle wiper according to a third embodiment of the present invention.

Next, in FIG. 10, a rear view of the neighborhood of the pivot shaft 18 of the wiper 60 according to a third embodiment is shown.

At the lower end of the pivot shaft 18, one end of a pivot lever 62 is fixed. The pivot lever 62 is formed with a relatively wide rectangular form. By rocking the pivot lever 62, the pivot shaft 18 can be rotated. To the other end of the pivot lever 62, the rod 64 is rotatably coupled by means of a supporting shaft 66. Along the outer circumference of an arcuately shaped end portion of the rod 64 in the neighborhood of the supporting shaft 66, a gear portion 68 is formed over substantially half of the circumference thereof and the gear portion 68 mates with the gear portion 28 of the inner bearing 24. Therefore, when the rod 64 is rotated about the supporting shaft 66, this rotational force is transmitted to the gear portion 28 via the gear portion 68 so that the inner bearing 24 is rotated in a direction opposite to the rotational direction of the gear portion 68. Incidentally, in this case, the dimensions of each portion and the number of teeth are set so that the gear portion 28 is rotated at a speed twice as high as that of the gear portion 68.

The end portion of the rod 64 opposite to the end connected to the supporting shaft 66 is coupled to an intermediate portion of the lever 72. One end of the lever 72 is rotatably supported against the holder 22 by means of the supporting shaft 74 and, to its other end, one end of the link rod 32 is coupled. As a result, the driving force of the wiper motor 80 is transmitted to the lever 72 via the linkage rod 32 and the lever 72 is rocked about the supporting shaft 74 while the rocking force of the lever 72 is also transmitted to the pivot lever 62 via the rod 64.

In the third embodiment, when the wiper 60 is actuated, the driving force of the wiper motor 80 is transmitted to the lever 72 via the linkage rod 32 so that the lever 72 is rocked about the supporting shaft 74. When the lever 72 is rocked, the rocking force of this lever 72 is also transmitted to the pivot lever 62 via the rod 64 while the rod 64 is rotated about the supporting shaft 66 relative to the pivot lever 62.

As a result, since the pivot lever 62 is reciprocatively rotated, the pivot shaft 18 is reciprocatively rotated and the wiper arm 12A and the wiper blade 14A are reciprocatively rotated. In addition, at the same time, the rod 64 itself is rotated about the supporting shaft 66 relative to the pivot lever 62 and this rotating force is transmitted to the gear portion 28, so that the inner bearing 24 is rotated at an approximately double or greater speed in the same direction as that of the pivot lever 62. That is, the inner bearing 24 is always independently rotated in the same direction as the pivot shaft 18.

In consequence, also in the third embodiment, the inclination of the pivot shaft 18 relative to the baseplate 20 is changed according to the rotation of the wiper arm 12A and, even if the curvature of the window glass 15 is large, the attack angle of the wiper blade 14A can be set to be within the predetermined range.

In addition, in the third embodiment, since the inner bearing 24 is always rotated at an approximately double or greater speed in the same direction as the rotating direction of the pivot lever 62, the inner bearing 24 is necessarily reciprocated once for a single reciprocative motion of the pivot shaft 18 and wiper arm 12A and the wiper blade 14A. Therefore, also in this embodiment, the change in the direction of inclination of the pivot shaft 18 relative to the vehicle body, which is determined by the positions to which the pivot shaft 18 and the inner bearing 24 are relatively rotated, assumes a continuous and linear form. Accordingly, the angle of inclination of the pivot shaft 18 is changed so that the attack angle can be set to be within the predetermined range while at the same time this adjustment of the attack angle can be readily accomplished.

Figure 11:
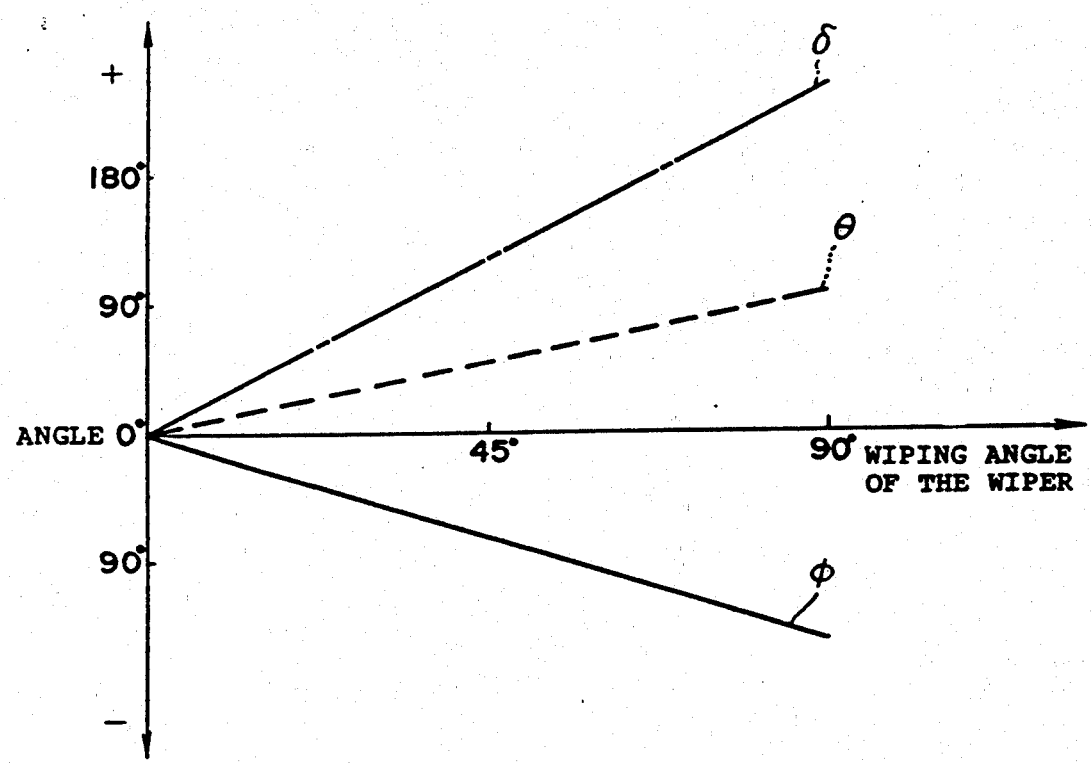
FIG. 11 is a diagrammatic view corresponding to FIG. 6A, which illustrates a change in the relative amount of rotation of the pivot shaft and the inner bearing with respect to each other corresponding to change in the wiping angle of a wiper according to the third embodiment of the present invention.

In FIG. 11, corresponding to FIG. 6A, change in the relative amount of rotation of the pivot shaft 18 and the inner bearing 24 with respect to each other corresponding to change in the wiping angle of a wipes is shown. Also in this figure, the line $\theta$ denotes the rotational arc of the pivot shaft 18 and wiper arm 12A (i.e., the wiping angle of the wiper blade 14A), line $\delta$ the rotational angle of the inner bearing 24 as a bearing and the line $\phi$ the relative amount rotational of the pivot shaft 18 and the inner bearing 24 with respect to each other. In addition, the "+" shown along the vertical axis of the figure represents the same direction relative to the rotational direction of the pivot shaft 18 while "−" represents the opposite direction with respect thereto.

As is obvious from FIG. 11, since the inner bearing 24 is always rotated in the same direction as the reciprocal rotational direction of the pivot shaft 18 and in the same cycle, it cannot happen that, in the intermediate portion of the angle constituting the wiping range as the wiping angle of the wiper blade 14A, the relative rotational directions of the pivot shaft 18 and the inner bearing 24 are inversed or that their relative rotational speeds are changed. As a result, the change in the direction of inclination of the pivot shaft 18 relative to the vehicle body (as indicated by line $\phi$), which is determined by the positions to which the pivot shaft 18 and the inner bearing 24 are relatively rotated, assumes a continuous and linear form.

Accordingly, the angle of inclination of the pivot shaft 18 is changed, so that the attack angle is capable only of being set to the predetermined range, but also this adjustment of attack angle can be readily accomplished. As described above, the wipers 10, 50 and 60 according to the above-described embodiments are necessarily reciprocated once for a single one-directional reciprocative movement of the pivot shaft 18 and in the same cycle because the inner bearing 24 is always reciprocally rotated in a direction opposite to or in the same direction as the reciprocal rotating direction of the pivot shaft 18. Accordingly, it cannot happen that, in the intermediate portion of the angle constituting the wiping range (angle) of the wiper arm and blade, the relative rotational directions of the pivot shaft 18 and the inner bearing 24 are made to be opposite to each other or that their relative rotational speed is greatly changed. As a result, the change in the direction of inclination of the pivot shaft 18 relative to the vehicle body, which is determined by the positions, to which the pivot shaft 18 and the inner bearing 24 are relatively rotated, assumes a continuous and linear form.

Accordingly, the angle of inclination of the pivot shaft 18 is changed so that the attack angle is capable not only of being set to be within the predetermined range, but also, this adjustment of attack angle can also be readily accomplished.

Incidentally, although in the above-described embodiments, the right wiper 10A of the wiper 10 of a parallel interlocking system is described, it is of course possible for the left wiper 10B to assume a similar arrangement. In addition, the present invention is not necessarily restricted to the wiper 10 of a parallel interlocking system, but may be applied to a so-called one arm wiper.

Further, although in the above-described embodiments, the rotating force is transmitted to the inner bearing 24 and the pivot shaft 18 via the linkage rod 32 coupled to a single wiper motor 80 (driving source), the present invention is not restricted to this, but the inner bearing 24 and the pivot shaft 18 may be each coupled to a different driving source so that the inner bearing 24 is always rotated (interlocked) in a direction opposite to or the same direction as the pivot shaft 18 and in the same cycle.

Even in this case, it cannot happen that, in the intermediate portion of the wiping range (angle) of the wiper arm and blade, the relative rotational directions of the pivot shaft 18 and the inner bearing 24 are caused to be opposite to each other or their relative rotational speed is changed, with the result that the change in the direction of inclination of the pivot shaft 18 relative to the vehicle body can assume a continuous and linear form and the attack angle can be readily adjusted.

In addition, in the above-described embodiments, circular gears or gear portions were used but, alternatively, an eclipse gear or an eccentric gear may be used to allow a further fine adjustment.

As described above, the vehicle wiper according to the present invention is capable not only of allowing the attack angle to be set to be within a predetermined range, but also, the adjustment of the attack angle is be eased by simplifying the change in the direction of inclination of the pivot shaft relative to the vehicle body, while at the same time this advantage is achieved by a small-size and simple arrangement.

What is claimed is:

1. A wiper apparatus for use in a vehicle for wiping a windshield glass comprising:
    a holder fixed to a baseplate of a vehicle body;
    an eccentric bearing member rotatably supported in said holder so as to rotate relative to said vehicle body about an axis of the bearing member;
    a pivot shaft rotatably supported in said eccentric bearing member so as to be inclined relative to said axis and to reciprocatively rotate a wiper arm fixed thereto; and
    a rotating means coupled to a driving means, for reciprocatively rotating said eccentric bearing member and said pivot shaft such that said pivot shaft rotates relative to and with said eccentric bearing member;
    whereby changes in the inclination of said pivot shaft relative to the vehicle body are determined by the positions to which said pivot shaft and eccentric bearing member are relatively rotated, such that said changes in inclination are continuous and linear.

2. A wiper apparatus for use in a vehicle according to claim 1, wherein said rotating means comprises a lever crank means for transmitting a driving force from said driving means to said eccentric bearing member and said pivot shaft.

3. A wiper apparatus for use in a vehicle according to claim 2, wherein said lever crank means comprises a first driving apparatus for driving said pivot shaft, second driving apparatus for driving said eccentric bearing member, and a transmitting means for transmitting the driving force from said driving means into driving forces for said first and second driving apparatus respectively.

4. A wiper apparatus for use in a vehicle according to claim 3, wherein said first driving apparatus has a pivot shaft driving member for transforming a rocking movement from said driving means into a rotating motion to be transmitted to said pivot shaft.

5. A wiper apparatus for use in a vehicle according to claim 3, wherein said second driving apparatus comprises an eccentric bearing driving member for transforming a rocking movement from said driving means into a rotational movement to be transmitted to said eccentric bearing member, and inversion means for rotating said eccentric bearing member in a direction opposite to the rotational direction of said pivot shaft.

6. A wiper apparatus for use in a vehicle according to claim 5, wherein said inversion means comprises a first gear formed coaxially with said eccentric bearing member and a second gear mating therewith, wherein said first gear rotates in a direction opposite to that of said second gear.

7. A wiper for use in a vehicle according to claim 5, wherein said inversion means has a branching means with an intermediate portion that is rotatably supported, and one end of said branching means receives a rocking movement from said driving means, and the other end of said branching means is interlocked to said second driving apparatus so as to move in a direction opposite to a rocking movement direction of said first driving apparatus.

8. A wiper apparatus for use in a vehicle according to claim 3, wherein said second driving apparatus comprises eccentric bearing driving members for transforming a rocking movement from said driving means into rotational movement for transmission to said eccentric bearing member, and a rotating member for rotating said eccentric bearing member in the same direction as the rotational direction of said pivot shaft.

9. A wiper apparatus for use in a vehicle according to claim 8, wherein said eccentric bearing driving members comprise a first gear formed coaxially with said eccentric bearing member and a second gear mating therewith to transform the rocking movement from said driving means into rotational movement.

10. A wiper apparatus for use in a vehicle according to claim 9, wherein said rotating member is provided with said second gear at one end, transmits the rocking force from said driving means into driving forces for both said first and second driving apparatus respectively, and rotatably supports one end of said first driving apparatus, so that said first and second driving apparatus are rotated in the same direction.

11. A wiper apparatus for use in a vehicle according to claim 10, wherein said rotating member interlocks with said eccentric bearing member so as to ensure that the angle of rotation of said eccentric bearing member is larger than the angle of rotation of said pivot shaft.

12. A wiper apparatus for use in a vehicle according to claim 1, wherein the inclination of said pivot shaft relative to the axis of said eccentric bearing member is set so that an attack angle of a wiper blade, carried by said wiper arm, with respect to the surface of the windshield glass which is wiped by said blade, is at an angle within a range of ±5 degrees.

13. A wiper apparatus for use in a vehicle for wiping a windshield glass comprising:
a holder fixed to a baseplate of a vehicle body;
an inner bearing rotatably supported in said holder so as to rotate relative to the vehicle body about an axis of said inner bearing;
a pivot shaft rotatably supported in said inner bearing and inclined relative to said axis, said pivot shaft reciprocatively rotating a wiper arm fixed to said pivot shaft; and
a rotating means comprising a lever crank means coupled to a driving means, for reciprocatively rotating said inner bearing in a direction opposite to the direction of reciprocating rotation of said pivot shaft with said pivot shaft, said lever crank means comprising a first driving apparatus having a pivot shaft driving member for transforming a rocking movement from said driving means into rotational movement for transmission to said pivot shaft, second driving apparatus having an inner bearing driving member for transforming a rocking movement from said driving means into rotational movement for transmission to said inner bearing, and an inversion means for rotating said inner bearing in a direction opposite to the rotational direction of said pivot shaft, whereby the driving force is transmitted from said driving means into driving forces for both the first and second driving apparatuses respectively;
wherein the inclination of said pivot shaft relative to said axis of said inner bearing is set so that an attack angle of a wiper blade, carried by said wiper arm, with respect to a surface of the windshield glass which is wiped by said blade, is at an angle within a range of ±5 degrees.

14. A wiper apparatus for use in a vehicle according to claim 13, wherein said invention means comprises a first gear formed coaxially with said inner bearing and a second gear mating therewith, wherein said first gear rotates in a direction opposite to the rotating direction of said second gear.

15. A wiper for use in a vehicle according to claim 13, wherein said inversion means has a branching means with an intermediate portion that is rotatably supported, and one end of said branching means receives a rocking movement from said driving means, and the other end of said inversion means is interlocked to said second driving means so as to move in a direction opposite to a rocking movement direction of said first driving means.

16. A wiper apparatus for use in a vehicle for wiping a windshield glass comprising:
a holder fixed to a baseplate of the vehicle body;
an inner bearing rotatably supported in said holder so as to rotate relative to the vehicle body about the axis of said inner bearing, the inclination of said pivot shaft relative to the axis of said inner bearing being set so that an attack angle of the wiper blade with respect to the glass surface which is wiped by said blade, at tilting angle within a range of ±5 degrees;
a pivot shaft for reciprocatively pivoting a wiper arm fixed thereto by reciprocatively rotating about the axis of said pivot shaft; and
a rotating means comprising a lever crank means coupled to a driving means, and recprocatively rotate said inner bearing in a same direction as the direction of the reciprocative rotation of said pivot shaft with said pivot shaft, said lever crank means comprising a first driving apparatus having a pivot shaft driving member for transforming the rocking movement from said driving means into rotational movement for transmission to said pivot shaft, second driving apparatus having an inner bearing driving member for transforming the rocking movement from said driving means into rotational movement for transmission to said inner bearing and a same direction rotating member for rotating said inner bearing in the same direction as the rotational direction of said pivot shaft, and the driving force being transmitted from said driving means into driving forces for both said first and second driving apparatuses respectively.

17. A wiper apparatus for use in a vehicle according to claim 16, wherein said inner bearing driving members are each comprised of a first gear formed coaxially with said inner bearing and a second gear mating therewith to transform the rocking movement from said driving means into rotational movement.

18. A wiper apparatus for use in a vehicle according to claim 17, wherein said rotating member rotating in the same direction as the rotatational direction of said pivot shaft comprises said second gear of said inner bearing driving members at an end thereof for transmitting the rocking force from said driving means into driving sources for said first and second driving apparatus, and an end of said first driving apparatus is rotatably supported, so that said driving means is rotated in the same direction.

19. A wiper apparatus for a vehicle in claim 18, wherein said rotating member interlocks with said eccentric bearing member so as to ensure that the angle of rotation of said eccentric bearing member continuously remains a double or greater angle than the rotating angle of said pivot shaft.

* * * * *